Patented Sept. 2, 1952

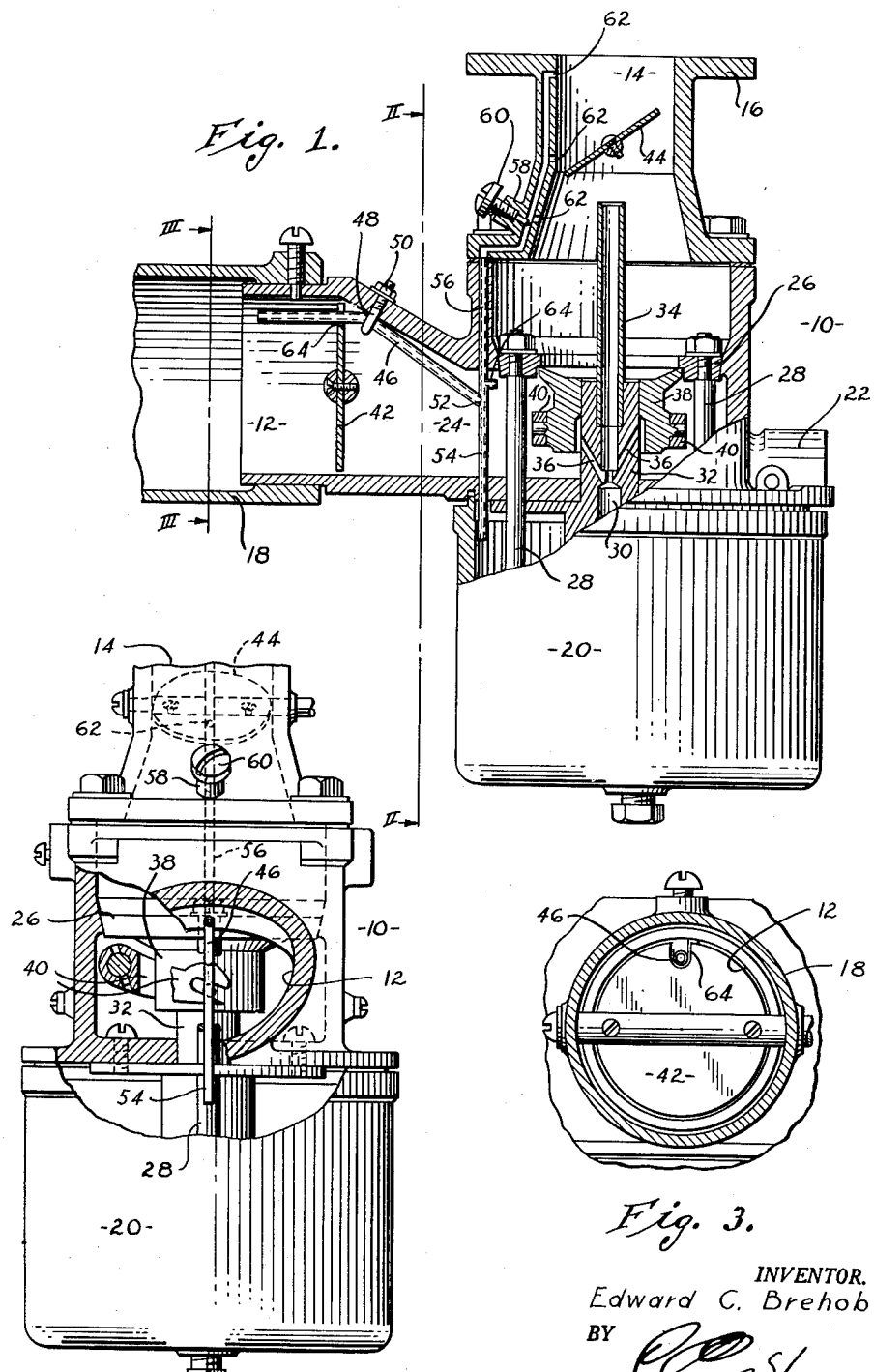

2,609,188

UNITED STATES PATENT OFFICE 2,609,188

AIR BLEED STRUCTURE FOR AUTOMATICALLY CONTROLLING AIR AND FUEL RATIO IN CARBURETORS AT VARYING ENGINE SPEEDS

Edward C. Brehob, Indianapolis, Ind.

Application November 22, 1948, Serial No. 61,366

4 Claims. (Cl. 261—72)

This invention relates to carburetors for internal combustion engines and more particularly to means for controlling the air-fuel ratio introduced into an internal combustion engine by the carburetor in the nature of an air bleed structure acting upon the level of fuel within the fuel bowl forming a part thereof.

The primary aim of this invention is to provide control means for the air and fuel ratio introduced into an internal combustion engine by a carburetor, particularly adapted for use on carburetors such as that forming the subject matter of U. S. Letters Patent No. 2,366,056, dated December 26, 1944, wherein air flow through the carburetor, together with the fuel to be mixed with such air, are induced by the inherent suction created by the internal combustion engine within the intake manifold thereof, the apparatus forming the subject matter of this invention utilizing such air flow to automatically control the ratio of air and fuel introduced into the engine.

It is common knowledge by those skilled in the carburetor art that in order to attain correct engine operation, a richer mixture of air and fuel is required when the engine is operating under a load. Such load varies in accordance with road and speed conditions, as well as with the particular type of vehicle that is motivated by the engine and the weight carried thereby.

Obviously, the rate of flow of raw fuel from the carburetor float bowl into the air stream through the carburetor, and thence into the engine, can be varied by changing the extent of air pressure upon the level of fuel within such bowl. The problem of automatically varying such air pressure as the requirements of the internal combustion engine change has, apparently, not heretofore been solved.

It is, accordingly, the most important object of this invention to provide structure for increasing and decreasing the flow of fuel from the bowl of the carburetor into the internal combustion engine automatically varying the air pressure upon the level of fuel within such bowl.

It is one of the objects of this invention to provide means for controlling the ratio of fuel and air output of a carburetor by means of apparatus for directing atmospheric air to the level of fuel within the bowl in variance with the primary air flow through the carburetor in combination with structure to counter-balance such air pressure in accordance with the extent of suction created by the internal combustion engine within the intake manifold thereof and, consequently, within the primary air passage of the carburetor.

Another important object of this invention is to provide a carburetor having a barometric tube disposed to direct air toward the level of fuel within the float bowl from the primary air intake of the carburetor, together with a conduit connecting such tube to vary the extent of air pressure within the fuel bowl which, in turn, varies in accordance with the extent of air flow through the carburetor, said conduit having direct connection with the outlet end of the carburetor, whereby the same is influenced by suction within such air passage.

Another important object of this invention is to provide a system of the above-mentioned character, wherein the conduit has at least one opening disposed next adjacent the throttle valve of the carburetor, to the end that the suction therein is varied in accordance with the position of said throttle.

A further object of the present invention is to provide a manual control means for the aforesaid conduit to control the extent of counter-balance which the suction therein has upon the barometric tube for the float bowl.

Other objects of this include the precise way in which the two above-mentioned air bleed structures are formed and interconnected to operate in combination and to cooperate in automatically varying the richness of mixture introduced into the internal combustion engine as requirements of the latter change.

In the drawing, Fig. 1 is a side elevational view of a carburetor, parts being broken away and in section to illustrate the air bleed structure for automatically controlling the air and fuel ratio at varying engine speeds, made in accordance with the present invention.

Fig. 2 is a fragmentary, side elevational view, parts being broken away and in section, taken on line II—II of Fig. 1, looking in the direction of the arrows; and, Fig. 3 is a detailed, cross-sectional view taken on line III—III of Fig. 1, looking in the direction of the arrows.

The carburetor, per se, shown in the drawing is for illustrative purposes only and, therefore, it is to be understood that the improvements forming the subject matter of this invention might well be used on carburetors having differing modes of operation from that about to be described. Basically, this illustrated carburetor operates on the principle of the aforesaid U. S. Letters Patent and need only be briefly described in order to present a full understanding of the subject matter of this invention.

This carburetor includes a hollow housing broadly designated by the numeral 10 having an air inlet 12 and an air outlet 14. An out-turned flange 16, formed on housing 10 next adjacent the outlet opening 14, serves to connect the carburetor directly to the intake manifold of an internal combustion engine (not shown) in the usual manner. A conduit 18, communicating directly with inlet opening 12 of housing 10, may either lead directly to the atmosphere or join with an air cleaner (not shown), as is the conventional practice.

A hermetically-sealed fuel bowl 20 extends from housing 10 and is connected directly thereto in any suitable, conventional manner. Fuel is introduced into the bowl 20 from a suitable source (not shown) by way of a tubular casting 22 integral with housing 10 and communicating with the interior of bowl 20. Any suitable valve may be provided within this fuel inlet control by a conventional float within bowl 20, all of which forms no part of this invention and is, therefore, not shown.

The continuous passageway of housing 10 interconnecting inlet 12 and outlet 14 is L-shaped in cross section as illustrated in Fig. 1 and broadly designated by the numeral 24. A vertically reciprocable, ring-like valve 26 is disposed within passageway 24 to control not only the flow of air through passage 24 but the flow of raw fuel from bowl 20. Valve 26 connects by means of vertically reciprocable posts 28 with a control valve (not shown) within fuel bowl 20 to permit varying amounts of raw fuel outflow from bowl 20.

As adequately set forth in the aforesaid U. S. Letters Patent, fuel and air mixture flows upwardly through a bore 30 formed in an elongated member 32 that interconnects passage 24 with bowl 20. A pipe 34 is disposed to receive such fuel mixture and direct the same into passage 24 immediately below outlet 14. Angled passages 36 place passage 24 in communication with bore 30 to introduce air into the latter for mixture with the raw fuel.

In the substantially closed position, shown by Figs. 1 and 2 of the drawing, valve 26 rests upon a member 38 slidable upon member 32 and manually operable by means of structure including a yoke 40. It is thus seen that movement of valve 26 and the fuel valve within bowl 20 toward and from their opened positions is controlled by the extent of suction within the intake manifold of the internal combustion engine created by operation of the engine itself and acting upon valve 26.

Accordingly, the rate of air flow through passage 24 from intake 12 to outlet 14 varies according to the position of valve 26 within the vertical leg of passage 24. Through manipulation of yoke 40, valve 26, together with the fuel valve within bowl 20, can be held in position for idling speeds of the internal combustion engine. Operation of yoke 40 and member 38, also, takes place during choking in conjunction with a butterfly valve 42 within housing 10 next adjacent the inlet opening 12.

A conventional throttle valve 44, having a connection (not shown) with any suitable accelerating means, is disposed within the passageway 24 spaced inwardly from outlet 14 of housing 10. The influence which the suction within the engine intake manifold has upon the flow of air through passage 24 and the flow of fuel and air in bore 30 and pipe 34 is controlled by throttle valve 44.

The carburetor just described, operable on the broad principle outlined in Patent No. 2,366,056 aforesaid, as well as many other carburetors of this character, are usually provided with a communication with bore 20 for directing atmospheric pressure on the level of fuel within bowl 20, whereby to establish a fuel level within bore 30 below the inlet end of air passages 36.

Although such air vent may be provided with manually adjustable means as a part thereof, when the carburetor is placed in use, the pressure upon the level of fuel in bowl 20 will not vary in accordance with the fuel requirements of the internal combustion engine. Accordingly, such disadvantage is designed to be overcome by the improvements of this invention about to be described.

A barometric tube 46 is mounted within the passageway 24 by means of a bracket 48, removably secured to housing 10 by means of a nut 50. Tube 46 has an open intake end disposed adjacent the inlet 12 of housing 10 and facing directly outwardly, as shown in Fig. 1 of the drawing. From inlet 12, tube 46 projects inwardly within passageway 24 of housing 10 to a point of connection 52 intermediate the ends of a vertical conduit 54.

Conduit 54 extends through the bottom wall of housing 10 and terminates at its lowermost end within the bowl 20 above the level of fuel therein, as determined by the float within bowl 20. Conduit 54 extends upwardly into a portion 56 within one wall of housing 10 defining a part of passageway 24 and thence circuitously, in accordance with the contours of housing 10, to a point spaced inwardly from flange 16 of housing 10, all as is clear in Fig. 1 of the drawing.

Boss 58, formed on housing 10 immediately below flange 16, threadably receives a manually-operable needle valve 60 having its pointed end extending into the conduit 54. A plurality of ports 62 place the conduit 54 in direct communication with air passage 24 next adjacent the throttle valve 44 and spaced inwardly from the outlet 14.

The outlet ports 62 are all arranged to one side of the needle valve 60 opposite to point of connection 52 and are arranged in such manner that the uppermost port 62 communicates with outlet 14, while the two lower ports 62 communicate with the interior of housing 10 when valve 44 is in the fully closed, horizontal position. The choking valve 42 has a slot 64 formed therein for clearing the pipe 46 and permitting movement of valve 42 to the fully closed position shown in Fig. 1. A branch 64 on conduit 54 places the same in direct communication with housing 10.

From the foregoing, it is clear that the pipe 46 and that portion of conduit 54 extending into bowl 20 from point of joinder 52 will always tend to direct air to the level of fuel within bowl 20 at atmospheric pressure. By the same token, conduit 54, extending from ports 62 to bowl 20, will always have a tendency to counterbalance the effect of air flow through pipe 46 to bowl 20, irrespective of the position of valve 44, since, even when the latter is in the fully closed position, one of the ports 62 will be exposed to engine suction existing at outlet 14.

The effective cross-sectional area of pipe 46 and conduit 54, as well as the diameters of ports 62, are chosen so that the air bleed structure forming the subject matter hereof operates as follows, and as varied manually by actuation of needle valve 60. When throttle 44 is in the idling position, pipe 46 will introduce atmospheric pressure upon the level of fuel in bowl 20.

While the flow of air through passageway 24 would ordinarily cause a pressure within bowl 20 above atmospheric pressure, even when the engine is idling, nevertheless, during such idling, there is sufficient suction within conduit 54 to counteract the pressure in pipe 46; and, therefore, during idling, atmospheric pressure exists in bowl 20. This condition, with respect to atmospheric pressure existing at the level of fuel within bowl 20, continues from idling position of throttle 44 to a position of valve 44 up to a speed of approximately 20 M. P. H., if the carburetor is used on an automobile, for instance.

The construction and relative sizes of the air bleed structure, also, causes an increase in air pressure directed to bowl 20, as well as a counterbalancing suction when the throttle 44 is opened to increase the speed of the automobile. Thus, in absence of conduit 54, opening of valve 44 to increase the air flow through passage 24 would cause the pressure within bowl 20 to be appreciably increased above atmospheric pressure and more raw fuel would be introduced into the engine than that required thereby.

However, since engine suction also increases at greater speeds and since such increased suction exists at outlet opening 14, the effect of the increased pressure within pipe 46 will be counterbalanced by suction within conduit 54 above connection 52. With needle valve 60 properly adjusted, the effect of suction within conduit 54 will be just sufficient to maintain atmospheric pressure or minus as desired on the level of fuel within bowl 20 up to a speed of approximately 60 M. P. H. or any constant speed.

Above such speed, and toward a point where throttle valve 44 is fully opened or during acceleration period when throttle 44 is in advance of corresponding constant speed position (manifold vacuum is very low during acceleration period), the extent of air flow through passageway 24 will be so great as to introduce more pressure into pipe 46 than can be overcome by suction within conduit 54. Accordingly, at speeds above 60 M. P. H., wherein the engine requires added fuel and richer mixture, there will be a pressure existing within bowl 20 that is greater than atmospheric pressure causing an increase in the flow of fuel into bore 30 and a resultant increase in fuel output of the carburetor through outlet 14.

By provision of a plurality of ports 62, the effect of suction within conduit 54 is progressively changed as the throttle valve 44 is moved toward a fully closed position, rather than an abrupt change in such counter-balancing effect of suction within conduit 54 which would be present if only one port 62 were provided.

There will be instances when it will be desirable to bleed air into circuit directly to outside of carburetor due to restricted air cleaner, etc., which would cause a minus pressure to exist at all times in carburetor.

It is appreciated that the form and contour of the air bleed structure above described will vary in accordance with the type of carburetor upon which the same is used and, while a single control means 60 is desirable in the particular carburetor herein illustrated, it may be desirable in other cases to provide means for varying the effective areas of pipe 46, of connection 52 and/or the lowermost end of conduit 54.

Manifestly, therefore, such changes and modifications as fairly come within the scope of this invention, as defined by the appended claims, are contemplated hereby.

Having thus described my invention, what I claim as new and desire to secure by Letters Patent is:

1. In a carburetor provided with a housing having an air passage therethrough interconnecting the intake manifold of an internal combustion engine with the atmosphere when the carburetor is placed in use, a fuel bowl having connection with said passage intermediate the ends thereof, and a valve in the passage adjacent that end thereof proximal to the intake manifold for controlling the flow of air and fuel into the intake manifold induced by suction created in the latter through operation of said engine; the improvement of which comprises means for introducing air into said fuel bowl at pressure varying with the extent of air flow through said air passage as determined by the position of said valve; and structure for introducing said suction to said means to counteract the flow of air in said means to an extent dependent upon the position of said valve, said structure comprising a pipe directly connecting said means and said passage adjacent the valve, said pipe having a plurality of ports opening into the passage, at least one port being on one side of the valve and the remaining ports being on the opposite side of the valve when the latter is closed.

2. In a carburetor provided with a housing having an air passage therethrough interconnecting the intake manifold of an internal combustion engine with the atmosphere when the carburetor is placed in use, a fuel bowl having connection with said passage intermediate the ends thereof, and a valve in the passage adjacent that end thereof proximal to the intake manifold for controlling the flow of air and fuel into the intake manifold induced by suction created in the latter through operation of said engine; the improvement of which comprises means for introducing air into said fuel bowl at pressure varying with the extent of air flow through said air passage as determined by the position of said valve; and structure for introducing said suction to said means to counteract the flow of air in said means to an extent dependent upon the position of said valve, said structure comprising a pipe directly connecting said means and said passage adjacent the valve, said pipe having a plurality of ports opening into the passage, and manually adjustable means for varying the effective cross-sectional area thereof, at least one port being on one side of the valve and the remaining ports being on the opposite side of the valve when the latter is closed.

3. In a carburetor provided with a housing having an air passage therethrough interconnecting the intake manifold of an internal combustion engine with the atmosphere when the carburetor is placed in use, a fuel bowl having connection with said passage intermediate the ends thereof, and a valve in the passage adjacent that end thereof proximal to the intake manifold for controlling the flow of air and fuel into the intake manifold induced by suction created in the latter through operation of said engine; the improvement of which comprises means for introducing air into said fuel bowl at pressure varying with the extent of air flow through said air passage as determined by the position of said valve; structure for introducing said suction to said means to counteract the flow of air in said means to an extent dependent upon the position of said valve, said structure comprising a pipe connecting said means and said passage adjacent the valve, said pipe having a plurality of ports opening into the passage; and manually adjustable means within said pipe between the ports and said means for varying the effective cross-sectional area of the conduit, at least one port being on one side of the valve and the remaining ports being on the opposite side of the valve when the latter is closed.

4. In a carburetor having a housing provided with an air inlet and an air outlet, a fuel bowl, means for directing fuel into air passing toward said outlet from the inlet, and a valve in the outlet for controlling outflow of air and fuel mixture from said outlet; means for automatically varying the air and fuel ratio of said mixture, said means comprising an open-end conduit disposed to place said fuel bowl into direct communication with the atmosphere exteriorly of the fuel bowl and tending to normally direct atmospheric air pressure toward the fuel in said bowl; and a pipe having direct connection with the conduit intermediate the ends thereof and with said air outlet for normally counterbalancing said pressure through suction within the conduit created by air flow through said outlet, said pipe having at least one opening formed in the housing in register with the outlet on each side respectively of said valve when the latter is closed, whereby the extent of said suction is varied to change said air pressure in the fuel bowl as the valve is moved toward and away from a position closing the air outlet.

EDWARD C. BREHOB.

REFERENCES CITED

The following references are of record in the file of this patent:

UNITED STATES PATENTS

| Number | Name | Date |
| --- | --- | --- |
| 2,029,142 | Wemhoner | Jan. 28, 1936 |
| 2,229,851 | Hufford | Jan. 28, 1941 |